United States Patent Office 3,523,095
Patented Aug. 4, 1970

3,523,095
EXTENDER RESIN FOR VINYL TILE FORMULATIONS, COMPOSITIONS CONTAINING IT AND PROCESS FOR MAKING IT
James J. Laurito, Coraopolis, and Harvey B. Wheeler, Pittsburgh, Pa., assignors to Neville Chemical Company, Pittsburgh, Pa., a corporation of Pennsylvania
No Drawing. Filed Mar. 9, 1967, Ser. No. 621,778
Int. Cl. C08f 19/04, 19/06
U.S. Cl. 260—23.7                                3 Claims

ABSTRACT OF THE DISCLOSURE

An extender resin particularly useful in vinyl asbestos tile formulations is obtained by polymerizing a hydrocarbon feed which is rich in or consists essentially of a polymerizable monomer such as styrene in the presence of a small amount of unsaturated higher fatty acid such as tall oil acid. In a preferred embodiment the acid-modified polymeric extender resin is further blended with a small amount of a low melting epoxide of low volatility to impart particularly desirable properties to it. A minor amount of a separately prepared hydrocarbon resin may also be blended with the acid-modified polymeric resin.

BACKGROUND OF THE INVENTION

The demand for floor tiles formulated from vinyl chloride polymers or copolymers, particularly when filled with asbestos fibers, is rapidly growing because of the superior qualities of such tiles in terms of solvent resistance, wear and other desirable properties. However, vinyl tiles are relatively costly because of the relatively high cost of the vinyl chloride polymer resin as well as because of the cost of the plasticizer and stabilizer which must be included in the tile composition in order to facilitate its processing and improve its flex as well as resistance to heat and ultraviolet light.

It is an object of the present invention to provide a new extender for vinyl tile formulation which reduces its cost and improves its processability or its final performance or both. Another object is to provide an improved vinyl tile formulation containing a relatively inexpensive extender. These and other objects will become more clearly apparent from the following description.

SUMMARY OF THE INVENTION

The vinyl tile extender of the present invention is a blend of (a) a base resin and (b) a minor proportion of an epoxide such as an alkyl glycidyl ether of low volatility or an epoxidized vegetable oil or fish oil.

The base resin is made by thermal copolymerization of a $C_5$ to $C_9$ polymerizable cyclic hydrocarbon such as styrene or a hydrocarbon fraction which is rich in such monomer, with an unsaturated higher fatty acid, for example, tall oil. Instead of using pure monomer such as styrene it is possible to use a mixture of the unsaturated monomer and a suitable polymerizable cracked petroleum fraction as the polymerizable hydrocarbon component of the feed. By varying the composition of the polymerization feed the ultimate softening point and other properties of the resulting polymer may be varied as desired.

Upon completion of the polymerization reaction the reaction mixture is stripped with steam to remove materials of relatively low molecular weight and thereby increase the softening point of the polymerized resin. Thereafter the stripped product is blended with a minor amount of an epoxide containing from about 4 to 10% oxirane oxygen such as an alkyl glycidyl ether or an alkyl epoxide containing from about 18 to 26 carbon atoms per molecule. Alternatively, the epoxide may be an epoxidized fatty acid triglyceride such as epoxidized soybean oil, epoxidized linseed oil or epoxidized fish oil. The alkyl glycidyl ethers usually have an oxirane oxygen content of about 4 to 5%; epoxidized soybean oil usually has an oxirane oxygen content of about 6 to 7%; epoxidized linseed oil usually has an oxirane oxygen content of about 7 to 9%; and epoxidized fish oils may have a still higher content of oxirane oxygen. As a further option, the softening point of the final extender product may also be adjusted by blending it with a separately prepared conventional hydrocarbon resin, e.g., a conventional hydrocarbon resin made by thermal or catalytic polymerization of an appropriate cracked petroleum fraction.

The inclusion of the tall oil in the formulation has been found to produce good wetting, mixing and banding when the tile formulation is milled.

The included epoxide improves the impact resistance of the finished tile and promotes tile color stability because it absorbs HCl evolved. The epoxide also lowers the softening point of the tile formulation, permits lower processing temperatures and reduces blistering during processing and in the finished tile. This avoids perhaps the main problem which has heretofore made vinyl tile processing difficult. Blistering has heretofore been a serious problem in vinyl tile processing. Some have attributed this blistering to the vaporization and escape of moisture from the included fillers at the relatively high processing temperatures heretofore required. Whatever the reason, vinyl tile formulated in accordance with the present invention can be processed at lower temperatures such that blistering can be avoided and a tile product of satisfactory properties is obtained.

Basically, a vinyl extender according to the present invention consists essentially of about 84 to 99% hydrocarbon which is copolymerized with 0.5 to 6% unsaturated higher fatty acid and includes 0.5 to 10% higher alkyl glycidyl ether. In terms of physical properties a vinyl extender made in accordance with the present invention has a softening point between about 95° and 130° C., preferably between 103° and 120° C.; a Gardner color from less than 1 to not more than about 9, preferably not more than 7; an unsaturation (Wijs iodine number) between 0 and about 60, preferably between 10 and 40; a solution viscosity (70% in toluene) from R to $Z_6$ or higher; and an acid number between 0 and about 20, preferably between 0 and 5 mg. KOH/gram of sample.

By way of further background, it should be kept in mind that a typical vinyl-asbestos tile formulation comprises the following components:

| Component | Percent |
|---|---|
| Vinyl chloride homopolymer or copolymer | 15.0–18.0 |
| Primary plasticizer | 5.3–6.5 |
| Stabilizer | 0.6–0.8 |
| Asbestos | 11.0–25 |
| Limestone | 48.0–63.0 |
| Pigment (e.g., $TiO_2$) | 3.0–4.0 |
| Total | 100 |

The present invention permits replacing from about 5 to 30% of the amount of vinyl chloride polymer with the relatively inexpensive novel extender. In addition to the saving resulting directly from this substitution, an important additional saving is obtained in that this substitution permits reducing the amount of required primary plasticizer by 5 to 10%, the amount of required stabilizer by 5 to 10% and the amount of pigment by 2% or more, without sacrificing ultimate product quality.

With regard to cost savings which this invention makes possible it is important to realize that although the inorganic filler (asbestos and limestone) is 70 to 75% by weight of the total formula, it is only 7 to 8% of its total cost. Conversely, the polyvinyl chloride resin, the primary plasticizer, the stabilizer, and the pigment represent only about 25 to 30% by weight of the total formula but constitute more than 90% of its total cost such that even relatively minor reductions in the proportions of these components lead to important savings. More specifically, among these four components the vinyl resin, at about $0.15 per pound, is relatively the least expensive one on a unit weight basis, the primary plasticizer at between about $0.16 and $0.20 is somewhat more expensive, a pigment such as titanium dioxide is about twice as costly as the vinyl resin, and the chemical stabilizer is usually more than three times as costly as the vinyl resin on a unit weight basis. In view of this cost structure, the present invention makes it possible to accomplish very substantial cost savings in total formula cost by permitting a reduction in the amounts of such seemingly minor components as the primary plasticizer, the stabilizer and the pigment.

DESCRIPTION OF THE PREFERRED EMBODIMENTS

The hydrocarbon feed stock used in preparing the novel extender resin is one which contains a major proportion of a thermally polymerizable, ethylenically unsaturated cyclic hydrocarbon having between 5 and 9 carbon atoms. Vinyl substituted benzene hydrocarbons such as styrene, alpha-methyl styrene and vinyl toluene are particularly preferred but other cyclic hydrocarbons such as vinylcyclohexene (cyclic dimer of butadiene-1,3), coumarone, indene, cyclopentadiene, methylcyclopentadiene and dimethylcyclopentadiene are also useful. Moreover, when a cyclodiene feed is used it may at least in part be supplied to the reaction in dimer form, e.g., as cyclopentadiene dimer, as methylcyclopentadiene dimer, as dimethylcyclopentadiene dimer or as a codimer of cyclopentadiene and methylcyclopentadiene, etc. Instead of using any of these polymerizable cyclic compounds in pure form, it is also possible to use several such compounds in mutual admixture, such as recycle styrene from an SBR polymerization process which contains a minor proportion of vinyl cyclohexene, or one can use the polymerizable compounds in the form of a cracked petroleum fraction containing between about 65 and 95% of these polymerizable unsaturated hydrocarbons, the remaining 5 to 35% usually being aromatic hydrocarbons such as toluene, xylene, etc. For instance, particularly useful are severely cracked petroleum fractions boiling in the heavy naphtha or light gas oil boiling range, e.g., between about 110° and 350° C.

A mass spectrometer analysis of a particularly suitable cracked petroleum fraction which was used in this work is shown in Table I.

In accordance with the present invention the hydrocarbon feed stock of the aforementioned type is thermally polymerized after adding thereto a minor amount, e.g., 1 to 10 parts, preferably between about 3 and 7 parts, per 100 parts of polymerizable hydrocarbon of an unsaturated higher fatty acid such as oleic or linoleic acid or a mixture of such acids, e.g., tall oil.

TABLE I.—COMPOSITION OF POLYMERIZABLE PETROLEUM FRACTION (MASS SPECTROMETER ANALYSIS)

| Identity | | Weight percent |
|---|---|---|
| Mass: | | |
| 78 | Benzene | 3.4 |
| 80 | Methylcyclopentadiene | 4.9 |
| 92 | Toluene | 18.0 |
| 94 | Dimethylcycopentadiene | 2.2 |
| 104 | Styrene | 3.5 |
| 106 | Xylene and ethylbenzene | 8.6 |
| 108 | Trimethylcyclopentadiene | 2.7 |
| 116 | Indene | 0.7 |
| 118 | Vinyltoluene, methylstyrene, indan | 1.9 |
| 120 | $C_3$ alkylbenzene | 10.7 |
| 128 | Naphthalene | 0.4 |
| 130 | Methylindene | 0.2 |
| 132 | DCPD and $C_2$ alkylstyrene | 1.5 |
| 134 | $C_4$ alkylbenzene | 10.3 |
| 142 | Methyl nephthalene | 0.4 |
| 144 | Dimethylindene | 0.1 |
| 146 | MDCPD and $C_3$ alkylstyrene | 1.4 |
| 148 | $C_5$ alkylbenzene | 4.2 |
| 156 | Dimethylnaphthalene | 0.2 |
| 158 | $C_3$ alkylindene | 0.4 |
| 160 | $C_4$ alkylstyrene | 2.8 |
| 162 | $C_6$ alkylbenzene | 1.8 |
| 170 | $C_3$ alkylnaphthalene | 0.1 |
| 172 | $C_4$ alkylindene | 0.3 |
| 174 | $C_5$ alkylstyrene | 1.8 |
| 176 | $C_7$ alkylbenzene | 0.8 |
| 184 | $C_4$ alkylnaphthalene | 0.1 |
| 186 | $C_5$ alkylindene | 0.4 |
| 188 | $C_6$ alkylstyrene | 1.0 |
| 202 | $C_7$ alkylstyrene | 0.3 |
| | Other $C_6$–$C_{15}$ hydrocarbons | 14.3 |
| | | 100.0 |

The acid-containing hydrocarbon mixture is non-catalytically polymerized by heating at between about 150° and 250° C., preferably between about 200° and 230° C., until the desired conversion is obtained. For instance, a conversion of between about 60 to 95% based on total polymerizable hydrocarbon and fatty acid charged is representative of a practical operation. To moderate an otherwise considerable rate of reaction, it is often advantageous to dilute the reaction mixture with a substantially unpolymerizable hydrocarbon diluent such as an aromatic hydrocarbon boiling between about 130° and 200° C. Xylene, butyl benzene and aromatic hydrocarbon fractions containing a mixture of hydrocarbons boiling in this stated range are examples of suitable polymerization diluents.

Upon completion of the polymerization step, unpolymerized material is removed from the mixture by steam stripping at elevated temperature or by equivalent means until a resin possessing the desired softening point is obtained. For instance, the polymerization product may be stripped until a resinous residue having a ring and ball softening point between about 95° and 150° C., preferably between about 115° and 135° C., is obtained. The average molecular weight of such a resin usually will fall in the range between about 1,000 and 3,000, e.g., about 2,000 or 2,500.

Finally, to produce an extender resin having the desirable properties described earlier herein, this resinous product is blended with about 3 to 10%, based on weight of the resinous polymerization products, of an epoxide such as an alkyl glycidyl ether of low volatility or exopidized vegetable oil, for instance, an alkyl glycidyl ether containing between 18 and 25 carbon atoms per molecule, e.g. Epoxide No. 45. This is a commercial product made by Procter & Gamble Company and contains an average of about 22 carbon atoms per molecule. The epoxide can be conveniently blended into the resinous polymer upon completion of the aforementioned steam stripping step and while the polymer is at a temperature above its melting point. If desired, a final adjustment in the melting point of the end product can be made by adding thereto a minor amount of a conventional light-colored hydrocarbon resin having an appropirate softening point. This auxiliary hydrocarbon resin may be either a thermal polymer or a catalytic polymer.

The invention will now be further illustrated by the following working examples:

EXAMPLE 1

Part 1

A base resin was prepared from a feed consisting of 3,034 ml. (63.2 vol. percent) styrene (sp. gr. 0.901 at 15.6° C.); 768 ml. (16.0 vol. percent) an essentially aromatic petroleum fraction comprising hydrocarbons containing from 6 to about 15 carbon atoms and having the approximate composition shown in Table I above; 38 ml. (0.8 vol. percent) tall oil, "Unitol DT" (sp. gr. 0.956); and 960 ml. (20 vol. percent) xylol. This feed was charged into a large laboratory bomb or pressure reactor. The polymerization was carried out by heating the contents for 24 hours at 200° to 225° C., in the course of which the reactor pressure rose to about 80 p.s.i.g. maximum. The charge was then subjected to steam stripping while being maintained at about 220° to 225° C. About 10 hours are required to vent and to strip the resin to a 123.5° C. softening point (Ring and Ball). The yield of stripped resin was 59.9 weight percent based on total charge to the reactor. The average molecular weight of this resin was about 2,200.

Part 2

Subsequently, a portion of the resulting stripped resin, i.e., 1,955.0 parts (95 weight percent) was blended in molten form with 103.0 parts (5 weight percent) of alkyl glycidyl ether containing about 22 carbon atoms per molecule, viz "Epoxide 45" (Procter & Gamble). As this epoxide melts at approximately 36.5° C. it can be conveniently melted and added in liquid form to the hot stripped resin.

The final hot melt blend has the following properties:

Ring and Ball soft point, ° C. _____ 103
Color: visual (Barrett Method No. 106), less than ¼
Color: Gardner (50% in toluene), less than _____ 8
Acid No. _____ 1.3
Wijs $I_2$ No. _____ 25.3
Gardner-Holdt viscosity at 25° C. (65% in toluene) _____ Z
Ave. molecular weight (number average by vapor pressure osmometer) _____ 1592

Part 3

In another embodiment, 1,955 parts (95 weight percent) of the stripped resin prepared as described in Part 1 above was blended in molten form with 103.0 parts (5 weight percent) of "ADMEX 711," which is an epoxidized soybean oil made by the Archer-Daniels-Midland Company and has an oxirane oxygen content of about 6–7%.

The resulting blend has the following properties:

Ring and Ball soft point, ° C. _____ 113
Color (Barrett Method No. 106) _____ ⅛
Gardner-Holdt viscosity at 25° C. (65% in toluene) _____ $Z_1$–$Z_2$
Ave. molecular weight _____ 2065

A comparison between Part 3 and Part 2 shows that the substitution of the $C_{22}$ alkyl glycidyl ether with the same amount of epoxidized soybean oil results in a somewhat higher melting blended resin. In other tests not shown here it has been found that increasing the epoxidized soybean content of the blended resin to about 8% produces a resin which has substantially the same softening point as the blended resin containing 5% of the alkyl glycidyl ether as described in Part 2.

EXAMPLE 2

To illustrate the effectiveness of the present invention standard vinyl asbestos tile formulations were compared with similar formulations wherein a portion of the resinous vinyl chloride polymer was replaced with the extender resins obtained in Example 1, Parts 2 and 3, respectively, and other minor adjustments were made in the composition as further shown in Table II. To make these comparisons the formulations shown in Table II were used.

The blends formulated as described in Table II were processed in the usual manner by milling on a two-roll calender and by molding floor tile from the resulting sheet. The processing characteristics and the tile properties obtained with each of these two formulations are summarized in Table III.

TABLE II.—TILE FORMULATIONS

| Formula composition | 1<br>Control,<br>grams | 2<br>Invention,<br>grams | 3<br>Control,<br>grams | 4<br>Invention,<br>grams |
|---|---|---|---|---|
| Vinyl resin (copolymer of 87% vinyl chloride and 13% vinyl acetate; Union Carbide VYHH) | 180.0 | 144.0 | 170.0 | 136.0 |
| Novel extender resin | | [1] 36.0 | | [2] 34.0 |
| Primary Plasticizer: | | | | |
| Dioctyl phthalate | 46.0 | 41.0 | 50.0 | 45.0 |
| Epoxidized soybean oil (ADMEX-711) | 5.0 | 5.0 | 5.0 | 5.0 |
| "MARK-140" Stabilizer (zinc organic salt, made by Argus Chemical Company) | 7.5 | 6.0 | 7.5 | 7.0 |
| "ACRAWAX" hard synthetic wax | 0.5 | | | |
| Stearic acid | 2.5 | 2.5 | | |
| Medium length asbestos fiber, JM-7R | 250.0 | 250.0 | 180.0 | 180.0 |
| Limestone, regular, 50 mesh | 478.5 | 488.5 | 557.5 | 566.0 |
| $TiO_2$ pigment | 30.0 | 27.0 | 30.0 | 27.0 |
| Total | 1,000.0 | 1,000.0 | 1,000.0 | 1,000.0 |

[1] From Example 1, Part 2.
[2] From Example 1, Part 3.

TABLE III.—EVALUATION OF TILE FORMULATIONS

| | Run Nos. | | | |
|---|---|---|---|---|
| | 1 | 2 | 3 | 4 |
| | Control | Invention | Control | Invention |
| Tile processing: | | | | |
| Temp., °F. mixing, milling | 220, Fair | 220, Fair | 220, Fair | 220, Fair. |
| Temp., °F. calender | 200, Poor | 200, Excellent | 200, Poor | 200, Good. |
| Mixing time, min | 15 min., Dry | 6 min., Wet | 15 min., Dry | 8 min., Wet. |
| Banding | Fair | Fair | Fair | Fair. |
| Blistering | Poor | do | Poor | Do. |
| Discoloration in milling | Fair | Less than control | Fair | Less than control. |
| Tile properties: | | | | |
| Initial tile color | do | Good | do | Good. |
| Tile color stability, heat, 3 hrs. at 150° F | do | do | do | Do. |
| Indent. in mils, at 77° F. 1 min./10 min. max | 10.7/14.1 | 9.4/13.0 | 10.7/14.1 | 9.8/12.6. |
| Indent. in mils, at 115° F. 30 sec | 31.8 | 30.5 | 31.8 | 22.4. |
| Impact resistance (Asphalt Tile Institute Test) | (1) | (1) | (1) | (1). |
| Tile flexibility | >2.0″ | >2.0″ | >2.0″ | >2.0″. |
| Tile solvent resistance | Excellent | Excellent | Excellent | Excellent. |

[1] Greater than 5 drops.

Comparing Run 1 with Run 2 and Run 3 with Run 4, it can be seen from the above that the formulations employing the extender resins of this invention give a better and more compatible mix in a much shorter time than the controls. Runs 2 and 4 which embody the present invention were in every respect at least as good as the controls and in several important respects they were better. This is surprising because as compared with the controls, the formulations embodying this invention contained a substantial amount of the relatively inexpensive extender resin and a significantly lower proportion of the more expensive components, notably PVC resin, the primary plasticizers, chemical stabilizer and pigment. More specifically, Table III shows that the formulations comprising the novel extender resin had greatly superior mixing properties and produced tiles having significantly better color both initially and upon aging. In addition, they showed good indentation values both at room temperature and at 115° F.

It should be understood from the foregoing description that the present invention embraces within its scope many variations which have not been specifically described herein. It should also be understood that all amounts and proportions of materials are expressed herein on a weight basis except when it is indicated otherwise. The scope of the invention is particularly pointed out in the appended claims.

We claim:

1. A thermoplastic resinous composition composed of (i) a copolymer of (a) 100 parts of polymerizable hydrocarbon selected from the group consisting of styrene, alpha-methyl styrene, vinyl toluene, vinyl cyclohexene; cyclopentadiene, methyl cyclopentadiene, dimethyl cyclopentadiene and dimers and codimers of said cyclopentadienes; coumarone, indene and mixtures comprising at least two of these hydrocarbons, and of (b) about 1 to 7 parts of tall oil fatty acid, said copolymer having a melting point between about 115° and 150° C. and (ii) 3 to 10 parts of an epoxide selected from the group consisting of alkyl glycidyl ethers containing 18 to 26 carbon atoms per molecule and epoxidized fatty acid triglycerides; said composition being characterized by a softening point between about 95° and 130° C., a Gardner color from less than 1 to not more than about 9, a Wijs iodine number between 0 and about 60, a solution viscosity (70% in toluene) from R to $Z_6$, and an acid number between 0 and about 5 mg. KOH/g.

2. As an extender for vinyl resin tile compositions, a thermoplastic resinous composition according to claim 1 wherein siad polymerizable hydrocarbon consists essentially of a major proportion of styrene and a minor proportion of a cracked petroleum fraction comprising $C_7$–$C_{15}$ unsaturated cyclic hydrocarbons copolymerizable with styrene, and wherein the epoxide has an oxirane content of from about 4 to 10%.

3. A thermoplastic resinous composition according to claim 2 wherein the epoxide is epoxidized soybean oil.

References Cited

UNITED STATES PATENTS

| 2,639,272 | 5/1953 | Griess et al. | 260—23 |
| 2,899,398 | 8/1959 | Pflaumer | 260—23 |
| 2,990,387 | 6/1961 | Bobalek et al. | 260—23 |
| 3,019,205 | 1/1962 | Buckley et al. | 260—23 |

FOREIGN PATENTS

| 709,011 | 5/1954 | Great Britain. |

DONALD E. CZAJA, Primary Examiner

D. J. BARRACK, Assistant Examiner

U.S. Cl. X.R.

260—23, 23.3, 23.5, 28.5, 31.8, 41